United States Patent
MacNeille et al.

(10) Patent No.: US 10,399,564 B2
(45) Date of Patent: Sep. 3, 2019

(54) VEHICLE ROUNDABOUT MANAGEMENT

(71) Applicant: Ford Global Technologies, LLC, Dearborn, MI (US)

(72) Inventors: Perry Robinson MacNeille, Lathrup Village, MI (US); Yimin Liu, Ann Arbor, MI (US); David Charles Weber, Toledo, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 339 days.

(21) Appl. No.: 15/333,224

(22) Filed: Oct. 25, 2016

(65) Prior Publication Data

US 2018/0111611 A1  Apr. 26, 2018

(51) Int. Cl.

| | |
|---|---|
| *B60W 30/09* | (2012.01) |
| *B60W 30/095* | (2012.01) |
| *B60W 10/04* | (2006.01) |
| *B60W 10/18* | (2012.01) |
| *B60W 10/20* | (2006.01) |
| *B60W 30/18* | (2012.01) |
| *G05D 1/00* | (2006.01) |
| *G05D 1/02* | (2006.01) |
| *G08G 1/16* | (2006.01) |

(52) U.S. Cl.
CPC ........ *B60W 30/0956* (2013.01); *B60W 10/04* (2013.01); *B60W 10/18* (2013.01); *B60W 10/20* (2013.01); *B60W 30/18163* (2013.01); *G05D 1/0088* (2013.01); *G05D 1/0219* (2013.01); *G08G 1/166* (2013.01); *G08G 1/167* (2013.01); *B60W 2550/20* (2013.01); *B60W 2750/30* (2013.01); *G05D 2201/0213* (2013.01)

(58) Field of Classification Search
CPC ....... B60W 30/0956; B60W 30/18163; B60W 10/04; B60W 10/18; B60W 10/20; B60W 2550/20; B60W 2750/30; G05D 1/0088; G05D 1/0219; G05D 2201/0213; G08G 1/166; G08G 1/167
USPC .......................................................... 701/25
See application file for complete search history.

(56) References Cited

U.S. PATENT DOCUMENTS

| | | | |
|---|---|---|---|
| 8,788,134 B1 | 7/2014 | Litkouhi et al. | |
| 8,914,181 B2* | 12/2014 | Essame | B60W 30/18163 701/23 |
| 9,534,910 B2* | 1/2017 | Okumura | G01C 21/34 |

(Continued)

FOREIGN PATENT DOCUMENTS

| | | |
|---|---|---|
| CN | 105551308 A | 5/2016 |
| DE | 102005048398 A1 | 4/2007 |

(Continued)

OTHER PUBLICATIONS

UK Search Report dated Apr. 17, 2018 re GB Appl. 1717181.0.

*Primary Examiner* — Anne M Antonucci
*Assistant Examiner* — James E Stroud
(74) *Attorney, Agent, or Firm* — Frank A. MacKenzie; Bejin Bieneman PLC

(57) ABSTRACT

A first phantom vehicle is projected into one of a branch and a circle lane of a roundabout in association with a first autonomous vehicle. The first autonomous vehicle is caused to enter the circle lane upon predicting no collision with oncoming vehicles. The first autonomous vehicle is caused to exit from the roundabout.

18 Claims, 11 Drawing Sheets

(56) References Cited

U.S. PATENT DOCUMENTS

| | | | |
|---|---|---|---|
| 2010/0106356 A1* | 4/2010 | Trepagnier | G01S 17/023 |
| | | | 701/25 |
| 2015/0203023 A1* | 7/2015 | Marti | B60Q 1/00 |
| | | | 340/425.5 |
| 2016/0161270 A1 | 6/2016 | Okumura | |

FOREIGN PATENT DOCUMENTS

| JP | 2015022419 A | 2/2015 |
|---|---|---|
| JP | 201593590 A | 5/2015 |
| JP | 2017186008 A | 10/2017 |

* cited by examiner

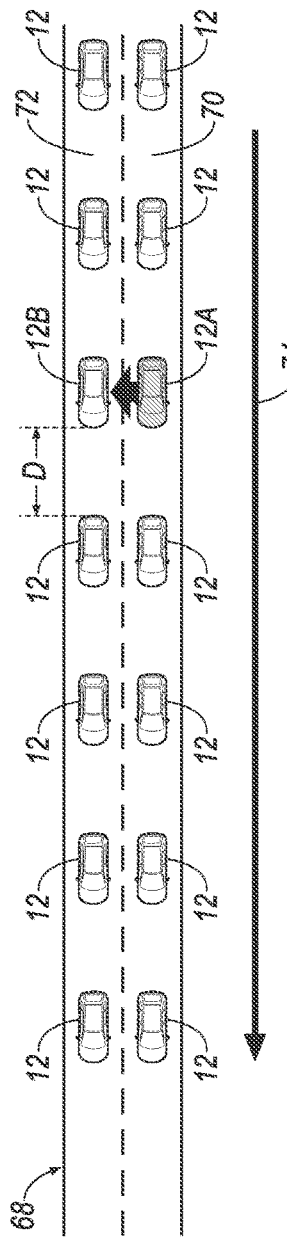
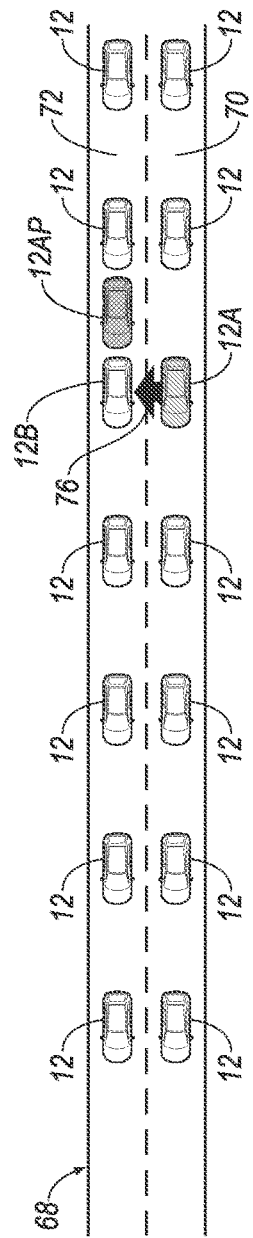
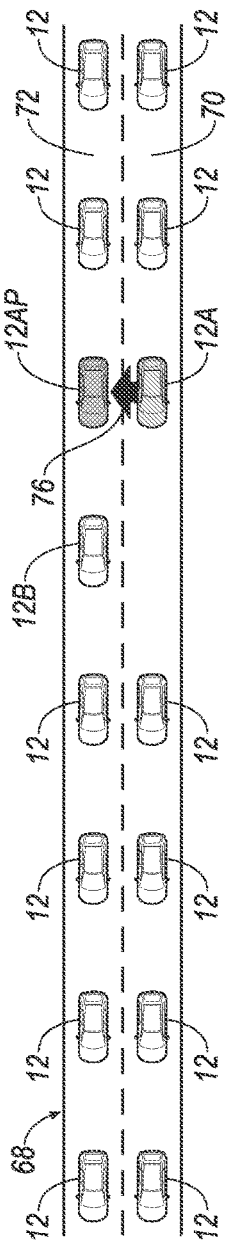
FIG. 4A
FIG. 4B
FIG. 4C

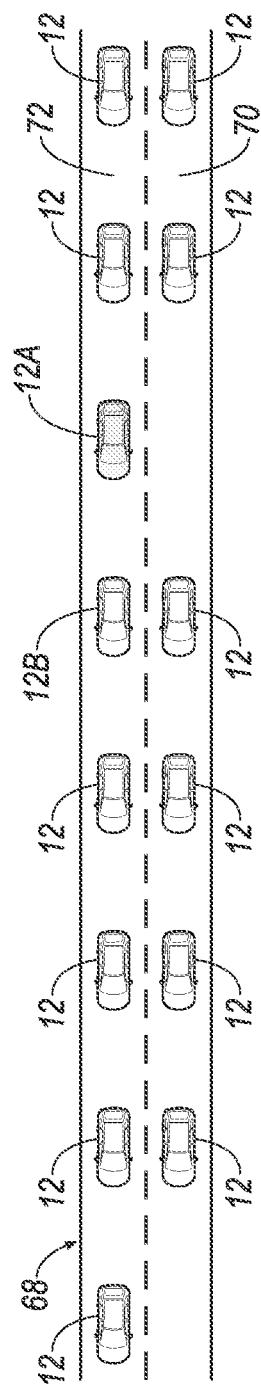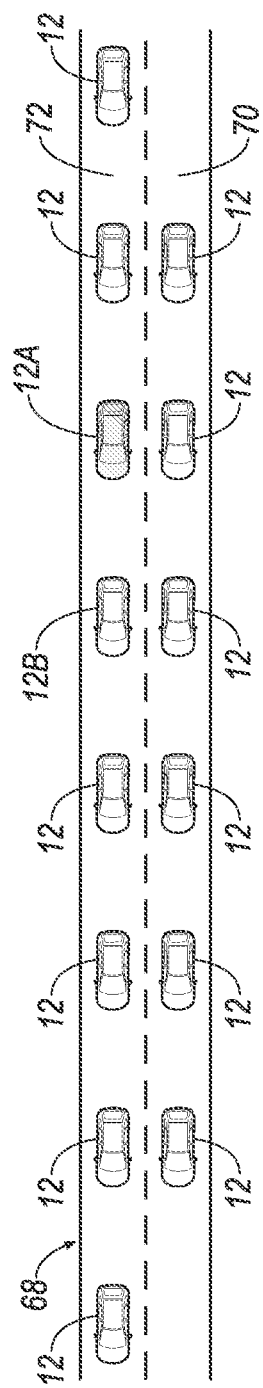

VEHICLE ROUNDABOUT MANAGEMENT

BACKGROUND

Roundabouts offer an improvement in safety over crossroad-type intersections in which the roads cross over each other, due at least to the elimination of head-on traffic at the intersection. Roundabouts also offer an improvement by allowing an increased rate of throughput of vehicles through the intersection when the intersection is one requiring a restriction of traffic in both directions. However, the improvement of traffic flow provided by a roundabout may be limited by factors including the number of lanes in the roundabout and the spacing of vehicles from each other. Additionally, traffic flow in roundabouts may be slowed by signs directing at least human drivers entering the roundabout to slow and to give way to traffic already on it.

BRIEF DESCRIPTION OF THE DRAWINGS

FIGS. 4A through 4E illustrate an exemplary lane change sequence.

DETAILED DESCRIPTION

Introduction

A first phantom vehicle is projected into one of a branch and a circle lane of a roundabout in association with a first autonomous vehicle. The first autonomous vehicle is caused to enter the circle lane upon predicting no collision with oncoming vehicles. The first autonomous vehicle is caused to exit from the roundabout.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. Such example orientations are from the perspective of an occupant seated in a driver seat, facing a dashboard. In the Figures, like numerals indicate like parts throughout the several views.

Exemplary System Elements

Figure 1:
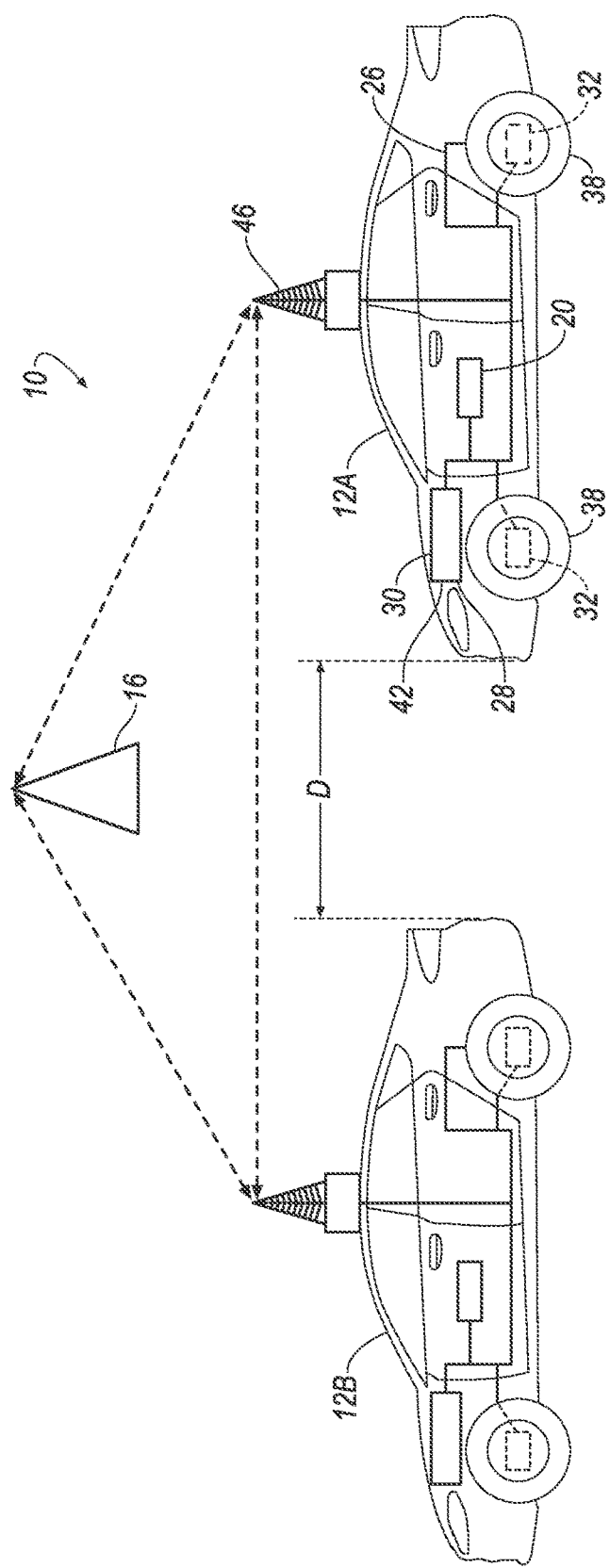
FIG. 1 schematically illustrates an example vehicle management system.

FIG. 1 schematically illustrates an example system 10 for controlling a size of gaps between vehicles, or vehicle spacing, of a plurality of autonomous vehicles 12 in a roundabout. System 10 may include an example first vehicle 12A, an example second vehicle 12B and an intersection controller 16. Vehicles 12A and 12B are each autonomous vehicles 12, and are labeled distinctively to allow distinguishing one vehicle from another. Vehicles 12A and 12B may be separated by a predetermined distance or gap D.

Figure 2:
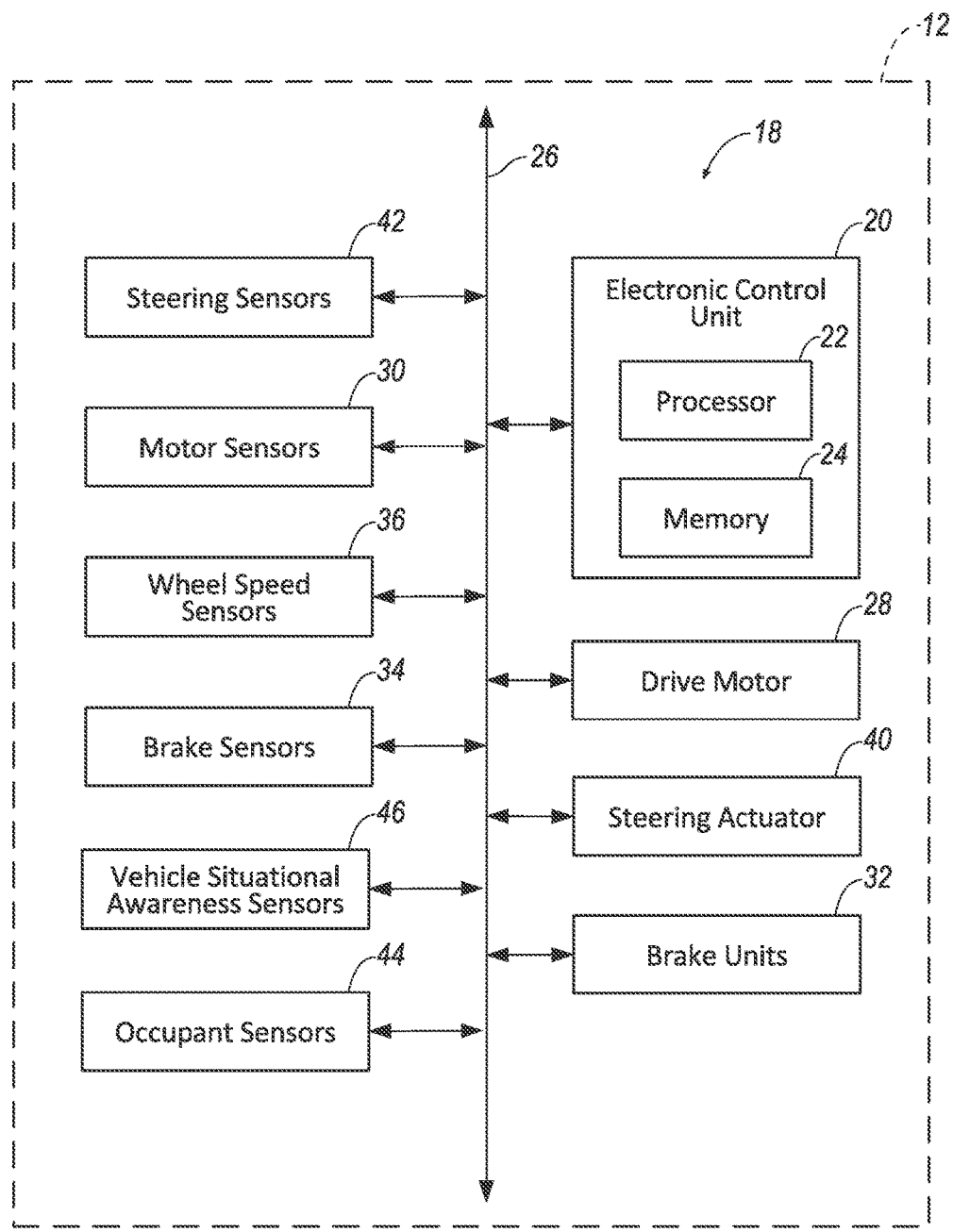
FIG. 2 schematically illustrates an example vehicle included in the system of FIG. 1.

Vehicles 12 are autonomous vehicles (as that term is defined below), schematically illustrated in FIG. 1, and shown in some additional detail in FIG. 2. Each vehicle 12 includes a pilot system 18 that may include a plurality of sensors and a plurality of actuators, connected to a computing device e.g., in the form of an electronic control unit or ECU 20.

ECU 20 includes an electronic processor 22 and an associated memory 24. System 18 may further include a vehicle network including one or more communications media such as an example system controller area network ("CAN") bus 26. Bus 26 provides a transmission media between and connecting elements of system 18 including ECU 20 and components and ancillary systems including, by way of example, a drive motor 28, motor sensors 30, a plurality of brake units 32, brake sensors 34, wheel speed sensors 36 associated with wheels 38, a steering actuator 40, steering sensors 42, occupant sensors 44, turning signals (not shown), and/or vehicle situational awareness sensors 46.

Vehicle 12 includes four wheels 38, each of which may include a tire (not shown). Each of wheels 38 may be associated with one of the brake units 32. Wheel speed sensors 36 may be integrated into brake units 32. Steering actuator 40 and associated steering sensors are incorporated into the vehicle 12 steering system. Motor 28 may, by way of example, be an internal combustion engine or an electric motor or a combination thereof. Although motor 28 is illustrated as a single unit near a front of vehicle 12, motor 28 may alternatively be located elsewhere in the vehicle 12. Motor 28 may yet alternatively be provided in the form of a plurality of electric motors associated with a plurality of wheels 38. An all-wheel drive vehicle may have a motor 28 associated with each wheel 36.

Each of drive motor 28, brake units 32, and steering actuator 40 are illustrated as connected directly to ECU 20 through bus 26, but may alternatively or additionally be connected directly to ECU 20. Each of drive motor 28, brake units 32, and steering actuator 40 may include a respective electronic controller that receives instructions from ECU 20.

The memory 24 of ECU 20 includes one or more forms of computer-readable media, and stores instructions executable by the processor 22 for performing various operations, including such operations as disclosed herein. ECU 20 includes programming to autonomously operate autonomous vehicle 12 in both a fully autonomous mode and a semi-autonomous.

For purposes of this disclosure, the term "autonomous vehicle" is used to refer to a vehicle operating in a fully autonomous mode. A fully autonomous mode is defined as one in which each of vehicle 12 propulsion (typically via a powertrain including a motor 28 as defined herein), braking, and steering are controlled by the ECU 20 under substantially all circumstances.

Autonomous vehicles may be further enhanced with vehicle-to-vehicle ("V2V") communications capabilities and vehicle-to-infrastructure and infrastructure-to-vehicle ("V2I-I2V") or more simply, V2I, communications capabilities. V2V communications capabilities allow a vehicle to communicate with other vehicles, and adjust vehicle spacing accordingly in anticipation of, by way of example, upcoming traffic issues. V2I communications capabilities allow interactive infrastructure devices, such as intersection controller 16, to communicate with vehicles 12. For example, vehicle 12 may be warned of an imminent intersection signal change requiring a change in speed.

V2V and V2I communications capabilities are features of vehicles equipped with coordinated adaptive cruise control ("CACC"), or CACC vehicles. References to CACC in this disclosure are inclusive of V2V and V2I communications capabilities. In ordinary CACC vehicles, propulsion and braking, but not steering, are controlled by ECU 20. In autonomous CACC vehicles, each of propulsion, braking and steering are controlled by ECU 20. For purposes of this disclosure, all CACC vehicles are autonomous CACC vehicles. A non-CACC vehicle includes any vehicle that is lacks V2V and V2I communications capabilities. A non-autonomous vehicle without adaptive cruise control, that is solely under the control of a human driver is an exemplary non-CACC vehicle.

Separately and collectively, V2V and V2I communications capabilities allow anticipation of upcoming traffic slowdowns and vehicles entering traffic that in turn allows a smoothing of the collective traffic flow. Circumstances that would result in gridlock or stop-and-go traffic with human drivers or fully autonomous but otherwise unconnected vehicles, may under CACC management, result in a relatively gentle slowing of traffic while maintaining a higher overall vehicle throughput.

Autonomous CACC vehicles may duplicate speed changes of an identified lead vehicle, and may also change lanes to either continue following the same vehicle or to follow a replacement lead vehicle. As used herein, a lead vehicle is a forward-most vehicle of one or more other vehicles. The lead vehicle together with the at least one other vehicle may be a platoon of vehicles. Platoon, as used herein, refers to a plurality of vehicles coordinating their travel down a road by following a lead vehicle. Such coordination is automated.

The memory 24 of ECU 20 also stores data. Data may include collected data that is collected from a variety of devices. In general, collected data may include any data from an appropriate map database, and any data that may be gathered by any data collection device including motor sensors 30, wheel speed sensors 36, steering sensors 42, occupant sensors 44, situational awareness sensors 46, and/or data computed from such data. Exemplary steering sensors may include a rack position sensor and/or a lateral acceleration sensor. Exemplary situational awareness sensors 46 may include vehicle context and position sensors and location sensors such as a radar sensor, a LIDAR sensor, a vision sensor (e.g., a camera), a global positioning system ("GPS") sensor, antennae and the like. Radar sensors may be used both for locating other objects, and for, by exploiting the Doppler effect, determining a relative velocity of such other objects. The foregoing examples are not intended to be limiting. Other types of data collection devices may be used to provide data to ECU 20. Data may also include calculated data calculated in ECU 20 from collected data and from other calculated data.

Figure 3:
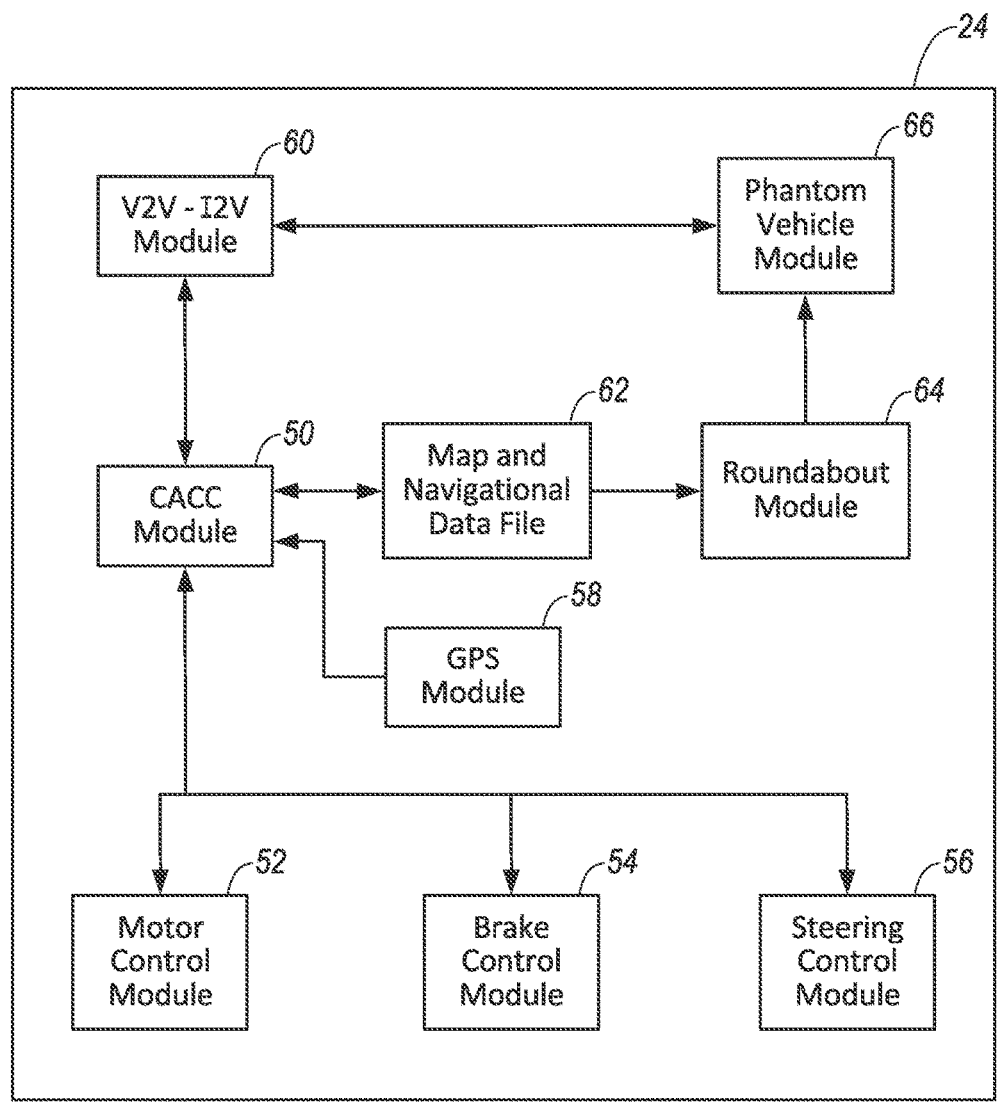
FIG. 3 illustrates an exemplary schematic of an arrangement of exemplary elements of control rules for operating the vehicle of FIG. 2 in an autonomous mode.

As noted above, the memory 24 of ECU 20 stores computer instructions. Such instructions may be organized into task modules directed to particular tasks as described in more detail below. FIG. 3 illustrates exemplary task modules.

A CACC module 50 includes computer instructions for operating motor 28 and brake units 32 to maintain vehicle 12, vehicle 12 being an autonomous CACC vehicle, a predetermined distance from another vehicle such as vehicle 12B. CACC module 50 may communicate with a motor control module 52 providing instructions to motor 28, a brake control module 54 providing instructions to brake units 32, and a steering control module 56 providing steering instructions to the vehicle steering actuator 40. CACC module 50 may include computer instructions for operating steering actuator 40 to allow autonomous following of a lead vehicle and when so directed to follow a newly chosen lead vehicle. CACC module 50 may determine coordinated instructions for each of modules 52, 54 and 56.

A GPS module 58 measures current position values using data indicative the current position of vehicle 12. Such data is provided to GPS module 58 by a GPS sensor among sensors 46. GPS module 58 may in turn provide and communicate such current position values to CACC module 50. CACC module 50 may include instructions allowing module 50 to calculate a predicted path of vehicle 12.

Such a predicted path may be calculated using dead reckoning based in part on data from motor sensors 30, brake sensors 34, and steering sensors 42 and the instructions provided by CACC module 50 to modules 52, 54, and 56. Such predictions may anticipate a position of vehicle 12 by a predetermined period of time, an exemplary period being 0.1 seconds. Equations for such dead reckoning may include equations for the path of the vehicle, as well as equations for the velocity of the vehicle.

Exemplary equations for the path may have the below form for a two dimensional Cartesian coordinate system:

$$x=a_x(t-t_0)^2-b_x(t-t_0)+c_x \text{ and } y=a_y(t-t_0)^2+b_y(t-t_0)+c_y$$

The above values are defined as follows:
x=longitude
y=latitude
$a_x$, $b_x$, $c_x$=Parameters transmitted by a CACC vehicle to define its path
$a_y$, $b_y$, $c_y$=Parameters transmitted by a CACC vehicle to define its path
t=time
$t_0$=time of CACC transmission Given the above path equations, the path velocity equations can be determined by taking a first derivative of the path equations, yielding $\dot{x}$ for path velocity in the x direction, and $\dot{y}$ for path velocity in the y direction:

$$\dot{x}=2a_x(t-t_0)+b_x \text{ and } \dot{y}=2a_y(t-t_0)+b_y$$

A V2V-I2V module 60 transmits and receives, through an antenna among sensors 46, CACC data. Such transmitted CACC data may include the above-discussed predicted path of vehicle 12 and received data may include a predicted path of another vehicle such as vehicle 12B. Further transmitted and received data may include data defining and recognizing a virtual or phantom vehicle generated by vehicle 12 or by vehicle 12B or by intersection controller 16.

A phantom vehicle may be used as a placeholder for a corresponding real vehicle, i.e., a vehicle physically embodied in hardware. Phantom vehicle, as used herein, means a disembodied representation of a vehicle that is perceived or recognized by other autonomous CACC vehicles and interactive infrastructure devices such as intersection controller 16. Phantom vehicles, even though data fictions, are treated by other vehicles as real vehicles that are not to be collided with. The phantom vehicles may be projected into traffic by the corresponding vehicle. The phantom vehicle may alternatively be projected by the intersection controller 16 or by another vehicle. Such alternative sources of phantom vehicles are allowed by the use of V2V and V2I communications. Other vehicles and controller 16 are thus allowed to know the location and destination of the neighboring vehicles and neighboring phantom vehicles. Common decision rules on queuing that may assign a ranked prioritization to individual vehicles and to platoons of vehicles further enables alternative sources of phantom vehicles. Exemplary ranking may be based on efficiency, or on fairness, or a combined consideration of both efficiency and fairness. The decision rules on queuing, responsive to such considerations, may assign individual vehicles and vehicles within platoons specific speeds and between-vehicle distances to be maintained. Each phantom vehicles continue to be treated as a real vehicle, even by the phantom vehicle's corresponding real vehicle, until the real vehicle and the corresponding phantom vehicle are caused to merge, i.e. meld, by the instructions.

A high definition map and navigation data file 62 may be included in memory 24. File 62 may communicate map data to CACC module 50 to allow CACC module 50 to determine appropriate commands or instructions to communicate to modules 52, 54, and 56. The CACC module 50 may also anticipate future locations, speeds, and accelerations of vehicle 12 based in part on braking signals, torque demand signals, and steering signals. Such anticipated locations, speeds, and accelerations may be shared with other vehicles and with any interactive infrastructure devices, including by way of example, intersection controller 16.

A roundabout module 64 may provide a protocol for a vehicle behavior in a roundabout. An example of such a protocol may include a protocol for vehicle spacing in a roundabout. Module 64 may also process instructions received from intersection controller 16.

Traffic studies have identified several key variables for use in maximizing a number of vehicles passing through a roundabout. Such variables include a critical gap, a follow-up time, and a headway distance. The critical gap is a distance between vehicles in the circle lanes of a roundabout that allows yielding vehicles waiting to safely enter the roundabout. The follow-up time is a timespan that a yielding vehicle must wait until the critical gap is available to the yielding vehicle. The headway distance is the distance or gap D between a first vehicle and a vehicle in front of the first vehicle. Such variables may be used by module 64 in controlling vehicle spacing.

The use of a computer or a network of computers that may include intersection controller 16 and vehicle ECUs 20. Controller 16 and ECUs 20 receive data indicative of a vehicle's location and speed. The availability of such data allows controller 16 and ECUs 20 to predict what a location of the vehicles within a roundabout 98 will be in a limited window of time (as described above). Controller 16 and ECUs 20 may also control CACC vehicle steering and CACC vehicle velocity. Such data and control allows each of critical gap, follow-up time and headway distance to be predicted and controlled and minimized by controller 16 and vehicle ECUs 20. Such minimization allows the computers and the network of computers to cause vehicles 12 to smoothly and efficiently move into and out of roundabout 98. Generation of phantom vehicles by one or more of the computers, such generation described in more detail below, may be used to enhance such control and parameter minimization. Roundabout module 64 may determine an appropriate location for a phantom vehicle generated by the computers.

A phantom vehicle module 66 within a CACC vehicle 12 may generate the phantom vehicle at a predetermined location relative to vehicle 12. Alternatively, the phantom vehicle may be generated by intersection controller 16. The phantom vehicle may be created by broadcasting CACC messages including path parameters $a_x$, $b_x$, $c$, $a_y$, $b_y$, $c_y$ that are accepted by other vehicles 12 and intersection controller 16 as indicators of a vehicle. Both real vehicles 12 and other phantom vehicles will treat the phantom vehicles as real vehicles, even though the vehicles may be able to distinguish real and phantom vehicles from each other. By using high definition map data, it is possible to calculate the parameters that place the phantom vehicle on the road in the predetermined location. The phantom vehicle module 66 of each vehicle 12 may also track both phantom and real vehicles including those of near an associated phantom vehicle. Predicted paths may be generated for phantom vehicles just as predicted paths are generated for real vehicles 12.

An exemplary location of a phantom vehicle may be behind a leading vehicle. An alternative exemplary location may be in a targeted lane position selected to reserve that position for use by vehicle 12 by maintaining a distance between the other vehicles in the targeted lane. Vehicle 12 may later, after melding, occupy the targeted space reserved by the phantom vehicle.

ECU 20 may be configured for communications on a vehicle network such as an Ethernet network or the CAN bus 26 or the like, and/or for using other wired or wireless protocols, e.g., Bluetooth®, Bluetooth® Low Energy, or WiFi. ECU 20 may also have a connection to an onboard diagnostics connector such as an OBD-II connector. Via the CAN bus 26, OBD-II, Ethernet, and/or other wired or wireless mechanisms, ECU 20 may transmit messages to various devices in a vehicle and/or receive messages from the various devices, e.g., controllers, actuators, sensors, switches, etc. as discussed herein. Although ECU 20 is shown as a single ECU in FIG. 1 and FIG. 2 for ease of illustration, it is to be understood that ECU 20 could in fact include, and various operations described herein could be carried out by, one or more computing devices, e.g., vehicle component controllers such as are known and/or a computing device dedicated to the discrete brake units 32, steering actuator 40 and motor 28.

Figure 6:
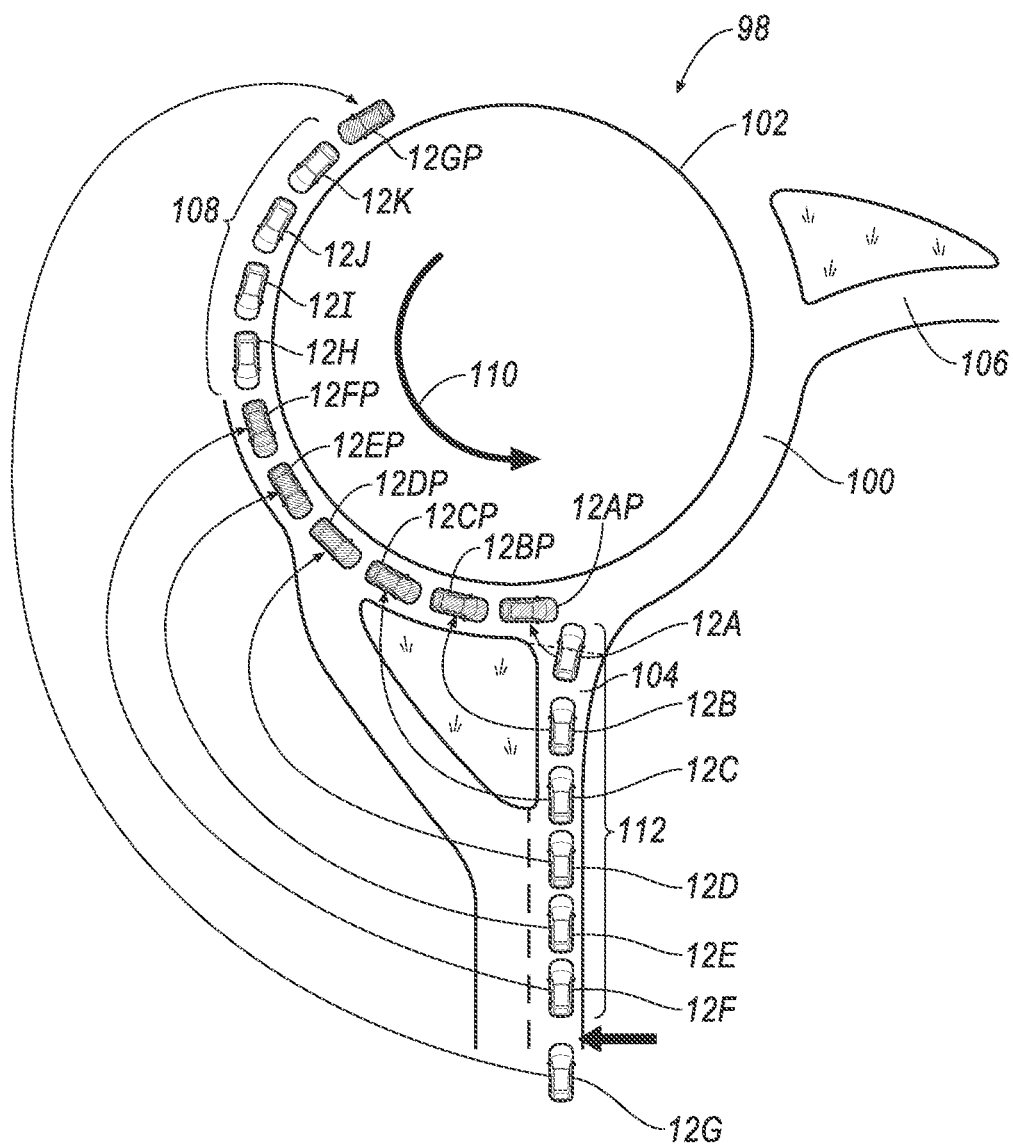
FIG. 6 illustrates an exemplary roundabout with vehicles approaching in a first branch.

Intersection controller 16 may also include situational awareness sensors like the sensors 46 of vehicle 12, allowing controller 16 to be aware of vehicles in and proximate to a roundabout with which controller 16 is associated. As illustrated in FIG. 6, Controller 16 may be located in a traffic island within a roundabout roadway. Controller 16 may also include a combination of sensors and software adapted to detect non-CACC vehicles. More specifically, controller 16 may be able to determine a location of each non-CACC vehicle in and proximate to the roundabout associated with controller 16. Controller 16 may further be able to determine a length of each such non-CACC vehicle, and identify the lane occupied by each such non-CACC vehicle. Controller 16 may communicate with CACC vehicles, with the CACC vehicles each having V2I communications capabilities. The V2I communications capabilities may be allowed by using low-power radio signals having a limited range. An exemplary communications system for controller 16 may be a dedicated short range communication ("DSRC") system. Controller 16, when actively employed, monitors vehicles and vehicle spacing in the roundabout and in branches feeding into the roundabout. Controller 16, for compatible vehicles, directs or causes a movement and synchronization or coordination of vehicles in the roundabout. One way of directing movement of vehicles in the roundabout is through the use of phantom vehicles. Vehicles 12 and 12B are equipped to recognize and track both hardware vehicles such as vehicles 12 and 12B and phantom vehicles generated by controller 16 and/or by other vehicles.

Processing

FIG. 4A shows an example two lane, single direction approach road 68 that forms part of a branch of a roundabout or alternatively transitions to such a branch. Road 68 has a left approach lane 70 and a right approach lane 72, or for brevity, lane 70 and lane 72. A first platoon of vehicles 12 and 12A is traveling in lane 70 in a direction of a travel direction arrow 74, towards the roundabout. Vehicles 12 may be spaced the distance D from each other. A second platoon of vehicles 12 and 12B is traveling in lane 72 in the direction of arrow 74 towards the roundabout. Vehicles 12A and 12B are laterally aligned with each other in their respective lanes. Vehicle 12A, based in part on its ultimate destination, anticipates making a right turn onto a next branch on the roundabout. Vehicle 12A is accordingly directed to move vehicle 12A to right lane 72 prior to reaching the roundabout, or at least prior to reaching circle lanes of the roundabout. A signal arrow 76 symbolizes that direction to change lanes. However, vehicle 12B is in the path of vehicle 12A, blocking the entry of vehicle 12A into lane 72.

FIG. 4B illustrates a creation or projection of a phantom vehicle 12AP between vehicle 12B and the following vehicle 12. Phantom vehicle 12AP may be created or projected by either vehicle 12A or by intersection controller 16 as described above. When vehicle 12AP is created by intersection controller 16, intersection controller 16 may provide signals to vehicle 12B via V2I communications requesting the insertion of the phantom vehicle 12AP.

Intersection controller 16 may also provide signals to the CACC vehicles proximate to a non-CACC vehicle, the signals requesting a longer distance or gap D between the CACC vehicles to facilitate a lane change by the non CACC vehicle. Alternatively, the CACC vehicles proximate to the non-CACC vehicle may track the non-CACC vehicle and provide a phantom vehicle on behalf of the non-CACC vehicle to create an opening between other CACC vehicles to allow the non-CACC vehicle to enter the lane. For example, a CACC vehicle may detect a non-CACC vehicle based on data from vehicle situational awareness sensors 46. Alternatively, a non-CACC vehicle may be detected by sensors of intersection controller 16. Confirmation of a detected vehicle as a non-CACC vehicle may be provided by an inability of both intersection controller 16 and CACC vehicles 12 to link to the sensed vehicle through either V2I or V2V communication channels. Having detected a non-CACC vehicle, proximate CACC vehicles may monitor the non-CACC vehicle for indicators of an intent to change lanes, such as an activation of turning signals by the non-CACC vehicle. CACC vehicles, responsive to detecting such intent, may create a wider gap D or insert a phantom vehicle as described above.

FIG. 4C illustrates the platoon in right lane 72 making room for phantom vehicle 12AP the same as if phantom vehicle 12AP were a real vehicle 12 embodied by hardware. The vehicles 12 in back of 12B slow relative to vehicle 12B to increase the gap therebetween. FIG. 4C also illustrates the platoon in left lane 70 shifting to align vehicle 12A with vehicle 12AP. Vehicle 12A and the vehicles 12 in back of 12A slow relative to the vehicles 12 in front of vehicle 12A. This temporary slowing allows vehicle 12A to align with phantom vehicle 12AP.

FIG. 4D illustrates vehicle 12A in lane 72, after having melded with phantom vehicle 12AP. Phantom vehicle 12AP has been deactivated or turned off once vehicle 12 A has taken its position in lane 72. A gap remains between vehicles 12 in lane 70 where vehicle 12A was formerly positioned. A lead vehicle 12 in lane 70 is illustrated as being abreast of a second vehicle 12 in lane 72, with the vehicles ahead of the gap having slowed to close the gap left by the slowing in lane 70 of vehicle 12A described above. Alternatively, all of the platoon in lane 70 could have slowed in the stage illustrated in FIG. 4C FIG. 4E illustrates vehicles 12 in lane 70 reunited into a single continuous platoon by absorbing the gap left by vehicle 12A. In the illustrated example, the vehicles 12 behind the void left by vehicle 12A were brought up to within the desired spacing of the vehicles 12 ahead of the void. Alternatively, the lead vehicles in each lane 70, 72 could have remained abreast of each other as in FIG. 4C, and the trailing vehicles 12 in lane 70 could have closed a two-vehicle gap left by the departure of vehicle 12A, so long as closing the gap would not violate any ordinances such as a speed limit ordinance.

Figure 5:
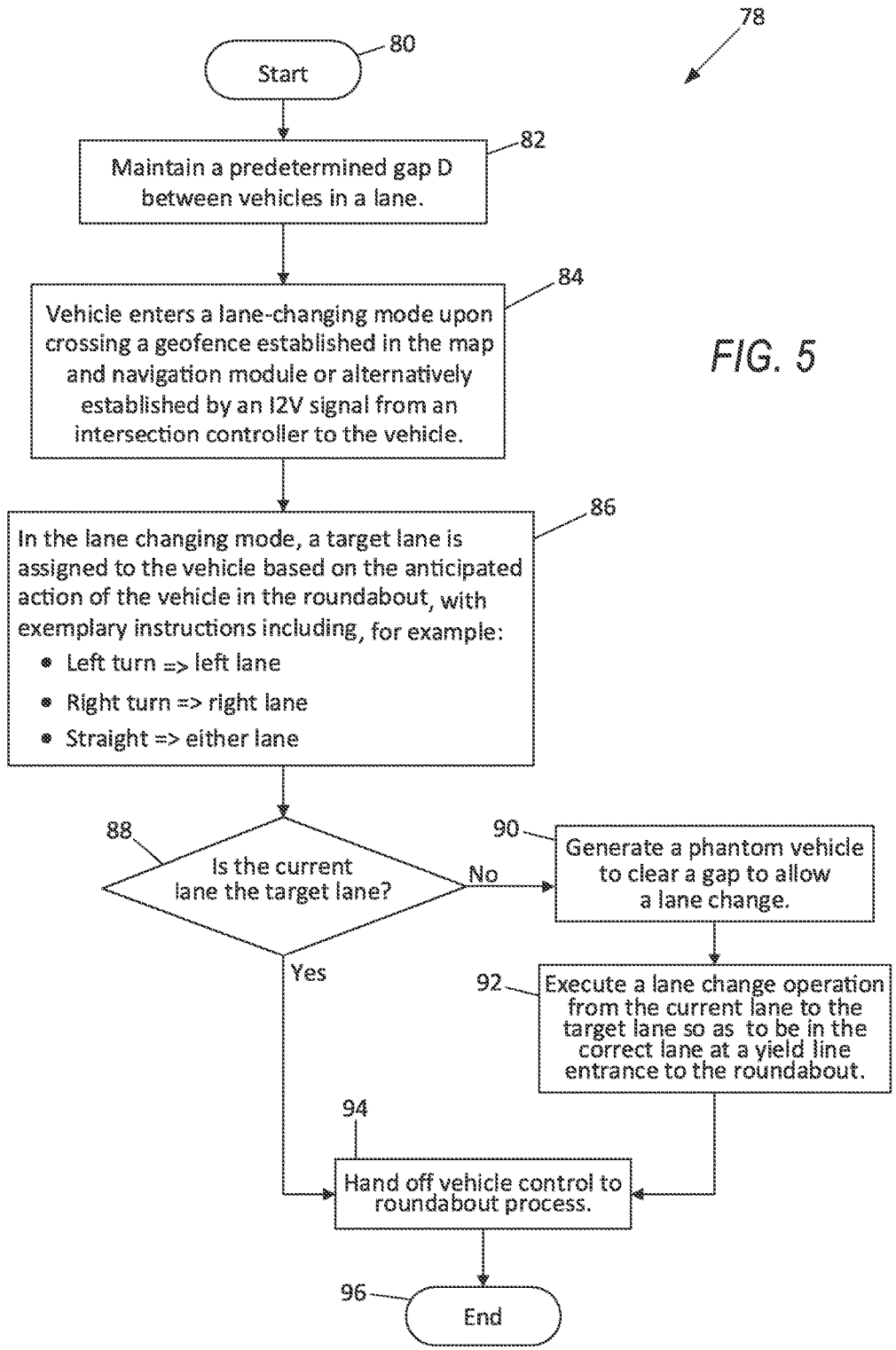
FIG. 5 illustrates a flow chart of example instructions for lane changes approaching a roundabout circle lane consistent with FIGS. 4A through 4E.

FIG. 5 illustrates an approach lane change process 78 stored in ECUs 20 of each of vehicles 12, 12A, 12B that allows management of a lane change consistent with the lane change process 78 exemplified in FIGS. 4A-4E. ECU 20 executes the steps illustrated in FIG. 5, and as demonstrated in FIGS. 4A-4E, as described below. A computer program for executing process 78 is instantiated in start block 80, e.g., when any of vehicles 12, 12A, 12B begin driving on a roadway.

Next, process block 82 attains and maintains a predetermined gap D between vehicles 12, 12A, 12B. Vehicles 12, 12A, 12B rely on their respective sensors 46, available data as described herein, and V2I and V2V communications to, on actuation of drive motor 28 and brake units 32, select, achieve and maintain the distance of gap D. Ideally, vehicles 12, 12A and 12B are placed together as closely as possible. Benefits associated with a small value for gap D, such as one meter, include a reduction in aerodynamic drag and an associated improvement in fuel economy for following vehicles. Another benefit is the increased vehicle density, permitting more efficient use of roadways including roundabouts 98. Operating conditions may render such a small gap impractical in some operating conditions. An exemplary optimal size for gap D between vehicles constituting a platoon is a gap size that will remain substantially the same or stable between platoon vehicles, even as the platoon accelerates and slows. The ability to maintain a stable gap may be limited by a length of the platoon. As the platoon lengthens, the stability of the gap may decrease. The magnitude or value of gap D may alter with some circumstances. Gap D may be large, for example, one or more vehicle lengths when vehicle 12, 12A, 12B is operating on an open road, and may be as small as one meter on limited access roads and in controlled roundabouts. Gap D may vary for a vehicle with the length of such vehicle. Gap D may further vary with a length of a trailing vehicle, and with a traffic density, density defined as the number of vehicles per unit of distance, in the open road, and in controlled roundabouts. Gap D may be further varied with vehicle speed, vehicle acceleration, road surface conditions, special road conditions (e.g., police stops, the presence of construction workers, stopped school busses with activated signals, and funeral processions), and special vehicle conditions (e.g. emergency vehicles having enhance right-of-way privileges such as ambulances, police cars and fire engines). Gap D may also be increased to accommodate insertion of a phantom vehicle. Alternatively, an inability to stably maintain a desired gap dimension may result in a platoon length being limited.

Process block 84 places vehicles 12, 12A and 12B in a lane changing mode as the vehicles 12, 12A, 12B cross a geofence that may be established in map and navigation data file 62, or alternatively indicated to vehicles 12, 12A, 12B by a signal from controller 16. A geofence is a virtual geographic barrier established by a computer program using GPS or radio frequency identification ("RFID").

An exemplary lane changing mode has ECU 20 determine which of the available lanes 70, 72 is most appropriate for the subject vehicle. Some roads may provide more than two available lanes. If there is only one available lane, process 78 may be bypassed. In process 78, process block 86 determines the appropriate lane for vehicles 12, 12A, 12B. Exemplary lane preferences among the two lanes 70, 72 available are left lane 70 for left turns, right lane 72 for right turns, and either lane 70 or 72 when proceeding straight. Process 78 then moves to decision block 88. Vehicles 12 and controller 16 may consider a plurality of factors in selecting between lanes 70 and 72 when approaching a roundabout 98, 150. Such factors may include a location of lanes roadway 68 relative to a roundabout exit branch, and a number of circle lanes in the roundabout. For example, when a vehicle's intended exit branch is a first branch after roadway 68 enters roundabout 98, then lane 72 may be preferred relative to lane 70 to facilitate the exit. When the first exit branch has two lanes (e.g., branches 162, 164), each of lanes 70 and 72 may be acceptable. As another example, when a vehicle's intended exit branch requires staying in roundabout 98 for a later exit, then lane 70 may be preferred relative to lane 72. Selection of lane 70 allows travel to a target exit branch without obstructing or unnecessary slowing vehicles exiting at earlier exit branches. Steering sensors 42 may provide data indicating an intended direction or angle of the vehicle. The data from sensors 42 may be used to predict the future location of vehicle 12 and to aid in a selection between lanes 70 and 72.

For the example illustrated in FIG. 4A, ECU 20 of vehicle 12A determines that vehicle 12A should be in right lane 72. As vehicle 12A is in left lane 70, a lane change is required, as indicated by arrow 76. This results in decision block 88 determining that the current lane 70 is not the target lane 72. Decision block 88, with a No decision, moves to process block 90.

Process block 90 generates phantom vehicle 12AP as illustrated in FIG. 4B. Phantom vehicle may be generated by vehicle 12A. Alternatively, vehicle 12AP may be generated by vehicle 12B responsive to a request from vehicle 12A to generate such a phantom vehicle. Yet alternatively, vehicle 12AP may be generated by controller 16 when vehicle 12A communicates its intended route to controller 16. Process 78 proceeds to process block 92.

Process block 92 executes the lane change from lane 70 to lane 72. One exemplary process for executing the lane change is illustrated in FIGS. 4C through 4E as described above. Upon completing the lane change, process 78 moves on to process block 94.

Process block 94 hands off control to a roundabout logic for control of vehicle 12A in the roundabout. Process 78 then moves to end block 96 and terminates. The roundabout logic may be located in roundabout module 64.

Roundabout logic manages a plurality of vehicle placement decisions in the roundabout. For example, the roundabout logic may: direct vehicles to, for example, one of an inner roundabout circle lane and an outer roundabout circle lane; establish spacing D between vehicles in the roundabout, establish the number of vehicles allowed onto the circle lanes from the branch lanes, and direct a vehicle to change lanes within the roundabout. Such determinations may be based on factors including, for example, a number of circle lanes in the roundabout, a diameter of the roundabout, a number of branches connecting to the circle lanes, the number of lanes in the branches, the lengths of the vehicle queues in the branches, and the presence and location of any non-CACC vehicles. The roundabout logic decisions may depend on data communicated by and received from other vehicles 12 and controller 16. Roundabout logic decisions may also depend on an expected behavior of non-CACC vehicles. Such vehicle lane changes may be facilitated by the generation of phantom vehicles in the circle lanes. An example is provided below in the context of FIG. 9.

When decision block 88 determines that the current lane is the target lane, process 78 moves to process block 94. As described above, process block hands off control to a roundabout logic. Process 78 moves to end block and terminates.

Having so transitioned from lane 70 to lane 72, vehicle 12A, and the platoons of each lane 70, 72, are now ready to enter the roundabout.

FIG. 6 shows an exemplary simple form of roundabout 98 having a single circle lane 100 circumscribing a traffic island 102. The exemplary illustrated lanes have the forward-moving traffic on the right side as is common in North America, however, the same concept may be used with forward-moving traffic on the left side as is common in the United Kingdom and Japan. Just a first branch 104 is shown in its entirety. A second branch 106 is partially shown second counterclockwise from first branch 104. An accumulation of seven vehicles 12A through 12G is queued in first branch 104. A second accumulation or a platoon of four vehicles 12H through 12K, highlighted by a first bracket 108, is already traveling in lane 100 in the direction of an arrow 110.

FIG. 6 also shows one phantom vehicle projected into lane 100 for each of vehicles 12A through 12G. The first six phantom vehicles, 12AP, 12BP, 12CP, 12DP, 12EP, 12FP, highlighted by a bracket 112, are projected in front of the platoon of vehicles 12H, 12I, 12J, 12K highlighted by bracket 108. The seventh vehicle 12G in branch 104 projects its phantom vehicle 12GP in back of the last vehicle 12K of the platoon of bracket 108.

As discussed above, while phantom vehicles 12AP through 12GP are described as being projected by the corresponding real or hardware vehicles 12A through 12G respectively, the phantom vehicles could alternately be projected by an intersection controller (not shown in FIG. 6) or by one of the other vehicles.

Figure 7:
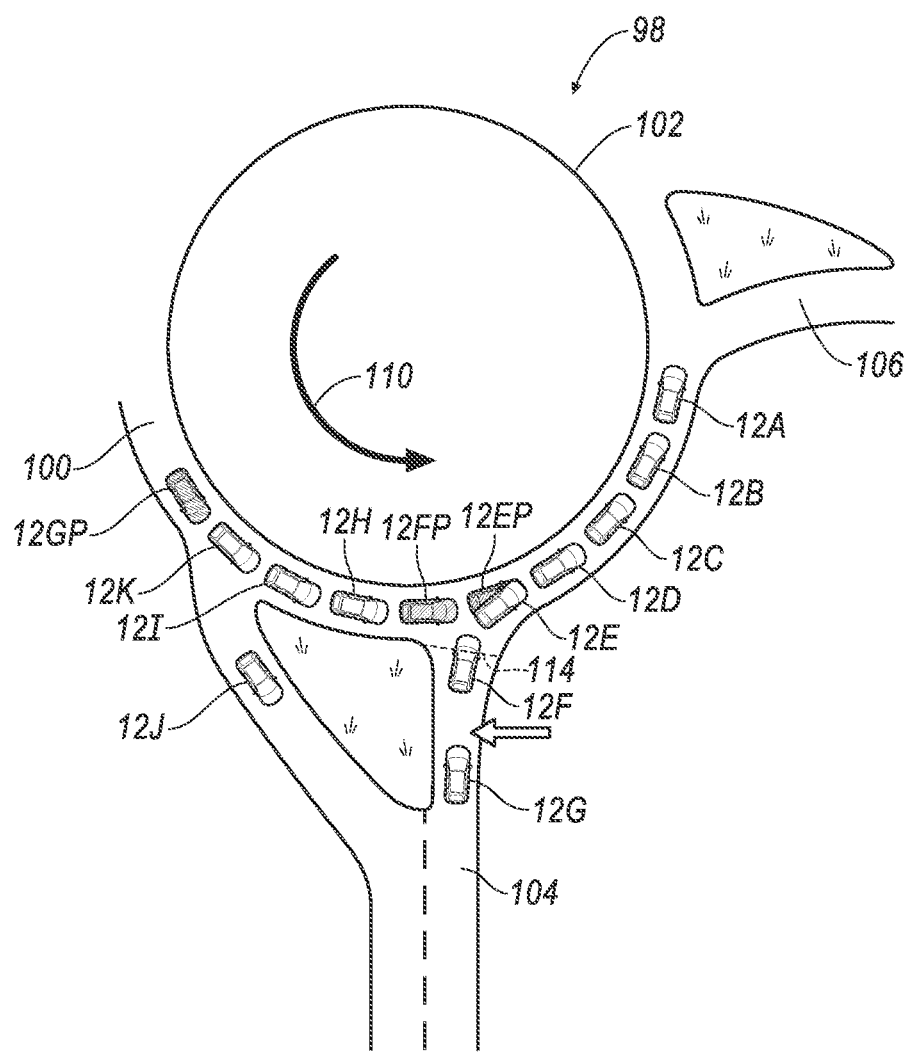
FIG. 7 illustrates the roundabout of FIG. 6 with the vehicle in the first branch entering a roundabout circle lane.

FIG. 7 illustrates a melding of real vehicles with their corresponding phantom vehicles. Vehicles 12A through 12D have melded with their respective phantoms 12AP through 12EP. Vehicle 12E is in the process of melding with its phantom 12EP. Vehicle 12F is on the threshold of melding with phantom vehicle 12FP. Vehicle 12J is exiting roundabout 98. Phantom vehicle 12GP remains in lane 100 behind vehicle 12K. Vehicle 12K has closed the gap left by the departure of vehicle 12J. Vehicle 12G may continue to track phantom vehicle 12GP. Once in lane 100, the vehicles may close gap D to as little as one meter. Vehicle 12G will halt at a yield line in branch 104 until vehicles 12H, 12I and 12K have passed. At that time, vehicle 12G will proceed past line 114, into lane 100 and meld with phantom vehicle 12GP.

Figure 8:
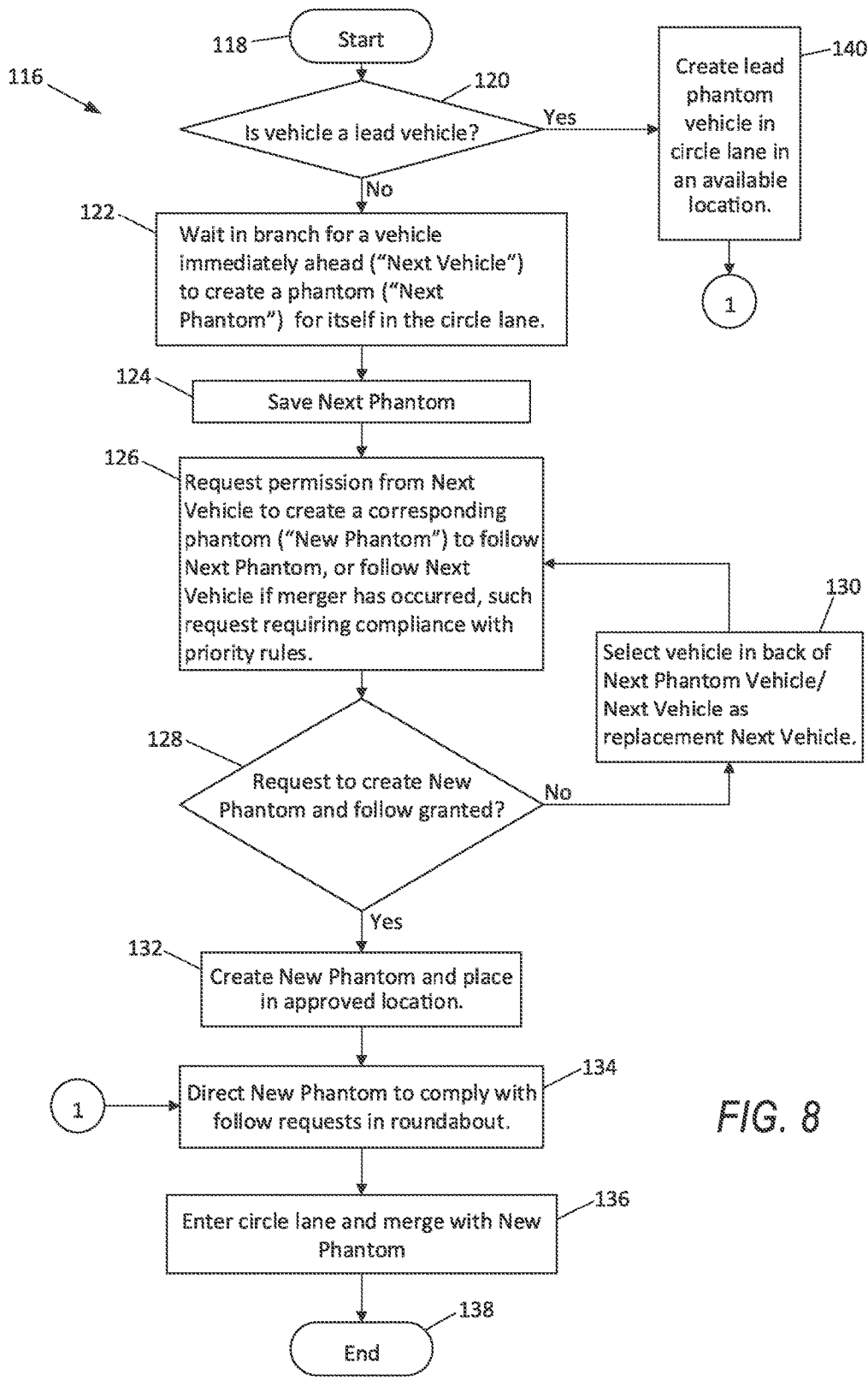
FIG. 8 illustrates a flow chart of example instructions for entry of vehicles from the branch to the circle lane shown in FIGS. 6 and 7.

FIG. 8 provides an exemplary illustration of a roundabout process 116 stored in ECUs 20 of each of vehicles 12A through 12K of FIGS. 6 and 7. ECU 20 executes the steps illustrated in FIG. 8, and as demonstrated in FIG. 6 and FIG. 7, as described below. A computer program for executing process 116 is instantiated in start block 118, e.g., when any of vehicles 12A through 12K begin driving on a roadway, or when any of vehicles 12A through 12K sense they are approaching a roundabout. For the purpose of brevity in the description of process 116, vehicles 12A through 12K may be referred to generically as vehicle 12.

Process 116 moves to decision block 120. Decision block 120 determines when the vehicle 12 is a lead vehicle, or a first of a plurality of vehicles, such as a platoon of vehicles, at or approaching the entrance to the circle lane 100. The entrance to circle lane 100 may be established by the yield line 114. For example, vehicle 12A is a lead vehicle, and vehicle 12B is not a lead vehicle, even after vehicle 12A has entered circle lane 100.

When vehicle 12 is not a lead vehicle, process 116 moves from decision block 120 to process block 122. Process block 122 directs vehicle 12 to wait in branch 104 until a vehicle immediately ahead (the "Next Vehicle") creates a phantom for itself (the "Next Phantom") in the circle lane 100. For example, vehicle 12B will identify vehicle 12A as the Next Vehicle. Process 116 moves to process block 124.

Process block 124 saves the Next Phantom. Vehicle 12 may save identifying features or characteristics of Next Phantom in ECU 20 to facilitate tracking Next Phantom. Process 116 moves on to process block 126. For example, vehicle 12B may save phantom vehicle 12AP or identifying features or characteristics of phantom vehicle 12AP.

Process block 126 requests permission from Next Vehicle to create a new phantom vehicle ("New Phantom") corresponding to vehicle 12. For example, vehicle 12B may request permission from vehicle 12A to create phantom vehicle 12BP and place it behind one of vehicle 12A and 12AP.

Decision block 128 follows process block 126. Decision block 126 determines when a request to create a New Phantom has been granted by Next Vehicle. When the request is not granted, it is presumed that there is already a blocking vehicle or phantom vehicle in back of Next Phantom Vehicle, or Next Vehicle if melding has occurred. Process 116 moves to process block 130 which identifies the blocking real or phantom vehicle. Process 116 then loops back to process block 126 to request permission from the new "Next Vehicle" to create a following New Phantom. If the request is again not granted, process 116 moves to the next vehicle in line until the request is granted.

For example, vehicle 12G may not have its request to create a phantom granted by 12F, as phantom vehicle 12FP is being closely followed by vehicle 12H. Similarly, vehicle 12H will not grant the request as it is already being followed. Ultimately, it is 12K that grants the request of vehicle 12F.

When decision block 128 determines that the request to create a phantom has been granted, process 116 moves to process block 132. Process block 132 causes the New Phantom to be created and placed in the approved location. For example, in the case of vehicle 12B, phantom vehicle 12BP is created and placed in circle lane 100 behind phantom vehicle 12AP. In the case of vehicle 12G, phantom vehicle 12GP is created and placed behind vehicle 12K. Process 116 then moves to process block 134.

Process block 134 directs the New Phantom to comply with follow requests in the roundabout. Since permission must be received from the Next Vehicle to follow the Next Vehicle or its phantom, the Next Vehicle is aware of its any such followers, both real and phantom. For example, 12GP will comply with follow requests directing it to follow vehicle 12K. Such requests may come from vehicle 12K or may alternatively come from intersection controller 16 when controller 16 is part of the roundabout intersection.

Process block 136 follows process block 134. Process block 136 has vehicle 12 enter circle lane 100 when vehicle 12 is aligned with the New Phantom. Vehicle 12 melds with its phantom, the New Phantom. For example, vehicle 12F is shown melding with its phantom vehicle 12FP in FIG. 7. Process 116 then moves to end block 138 and terminates.

In block 120, when the vehicle 12 is a lead vehicle, process 116 moves to process block 140. Process block 140 creates a lead phantom vehicle in the circle lane 100 in an available location. An available location is one in which there is no overlap of the phantom vehicle with either a real vehicle 12 or another phantom vehicle. Avoiding such overlap ensures there will be no collision between a vehicle entering circle lane 100 and melding with the phantom Process 116 then moves to process block 134, and proceeds as indicated above. For example, when vehicle 12A is at yield line 114, it may project its phantom vehicle 12AP into lane 100 at any point that does not interfere with a vehicle 12, either real or phantom, in lane 100. One preferred location for a phantom vehicle is close to the yield line 114 so as to allow vehicle 12A to meld with phantom vehicle 12AP just beyond line 114 without forcing vehicle 12A to come to a complete stop.

Figure 9:
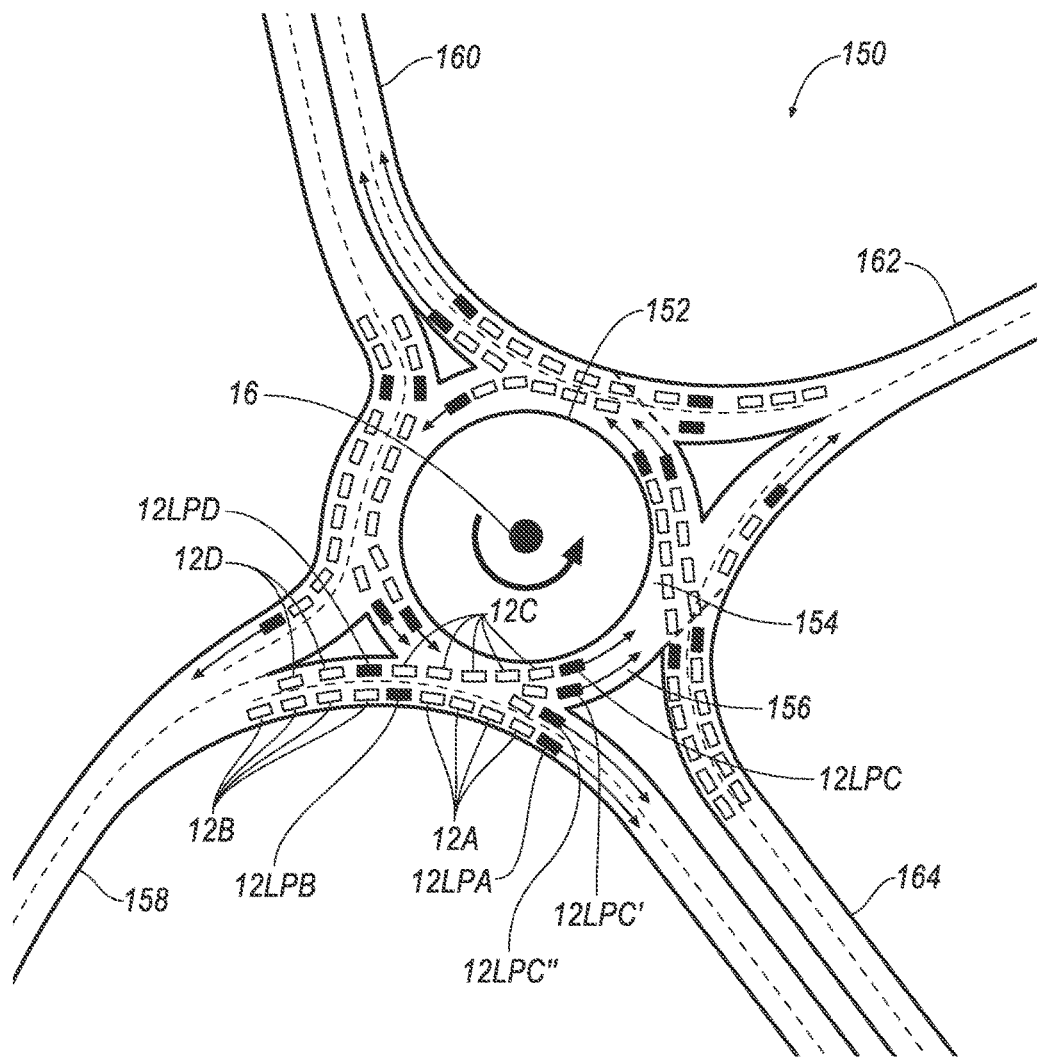
FIG. 9 illustrates an exemplary roundabout including a plurality of circle lanes.

FIG. 9 illustrates an example multilane roundabout intersection, or more briefly roundabout 150. Roundabout 150 as illustrated is an example controller-managed intersection. Roundabout 150 includes a traffic island 152 at its center with an exemplary plurality of two circle lanes encircling island 152, with one of the lanes being an inner lane 154 and a second of the lanes being an outer lane 156. A plurality of branches extend from lanes 154 and 156, with four being an exemplary number of branches. Starting at the bottom left of FIG. 9, roundabout 150 has, in a clockwise direction, four branches: first branch 158, second branch 160, third branch 162 and fourth branch 164. First and third branches 158, 162 are illustrated as opposed portions of a two lane road, with one lane in each direction. Second and fourth branches 160, 164 are illustrated opposed portions of a multi-lane highway, with branch 164 being a divided highway. Circle lane 156 melds into circle lane 154 between branches 162 and 160 for an additional complication.

Access of vehicles in branches 158-164 to inner lane 154 and outer lane 156 may be controlled by intersection controller 16 including a centralized control algorithm and which communicates with vehicles 12 via a DSRC system or other V2I method, or by a distributed control algorithm incorporated into roundabout module 64 of vehicles 12. The control algorithm, of either form, determines which vehicles from which branches get to enter which lanes and when.

The control algorithms of either intersection controller 16 or vehicles 12 may be configured to give priority to a perceived fairness of the system in that they substantially equalize vehicle wait times for each vehicle in the queues entering roundabout 150. Alternatively, the control algorithms may emphasize efficiency to maximize a flow of vehicles through roundabout 150 and maximize a density of traffic in circle lane 154 and 156, even though such efficiencies may force some vehicles, for example vehicles on a low-traffic branch, to wait for a much longer period of time than vehicles from a high traffic branch. To achieve higher through-put efficiencies, vehicles may be organized into platoons, with platoon length and the gap between vehicles within the platoon being selected to manage traffic flow through the roundabout. To achieve high efficiencies, it may be preferable to have the algorithm disposed in the intersection controller 16 to allow centralized control. Yet alternatively, the algorithm may seek to compromise such objectives, by establishing a maximum allowable wait time. Control algorithms may further regulate flow to avoid gridlock of the roundabout 150.

The control algorithms may use a plurality of phantom vehicles to aid the maneuvering of vehicles 12 through a roundabout. For example, a vehicle 12 entering roundabout 50 from branch 158 is known to be exiting at branch 160. Three phantom vehicles may be generated to facilitate vehicle 12's entry into, transit through, and exit from the circle lanes 154 and 156 of roundabout 150. A first phantom vehicle may be generated in outer lane 156 and a second phantom vehicle may be generated in inner lane 154 and a third phantom vehicle generated in outer lane 156. The entering vehicle 12 first melds with its first phantom vehicle in lane 156. To transition to inner lane 154, vehicle 12 melds with its second phantom vehicle. In anticipation of exiting at branch 160, vehicle 12 melds with its third phantom vehicle in outer lane 156. Vehicle 12 is then positioned to exit via branch 160.

Phantom vehicles may alternatively be used to lead vehicles from the branches into the circle lanes and eventual transit through roundabout 150, and to delay entry of vehicles into the circle lanes.

A phantom lead vehicle may be installed or projected in front of a queue of vehicles in the branch. Secondary phantom lead vehicles may be inserted into lines or queues exceeding a particular length, such as 6 or more vehicles, to break up the lines. The secondary phantom lead vehicles divide or split a line of vehicles to enable a maximum vehicle throughput rate of intersection 150.

A first example phantom lead vehicle 12LPA that originated from a right lane of branch 158 leads following vehicles 12A toward and onto branch 164. A second example phantom lead vehicle 12LPB waits in the right lane of branch 158 with vehicles 12B.

A third example phantom lead vehicle 12LPC that originated from a left lane of branch 158 leads following vehicles 12C into lane 154 responsive to lane 154 being selected by controller 16. A first alternative example phantom lead vehicle 12LPC' leads following vehicles 12C into lane 156. Second alternative example phantom lead vehicle 12LPC" leads following vehicles 12C into a left lane of branch 164. Depending on the ultimate destination of each of vehicles 12C, controller 16 may establish just one of phantom lead vehicles 12LPC, 12LPC' and 12LPC", or may instead select two or more of 12LPC, 12LPC' and 12LPC" for generation, with certain of vehicles 12C following designated phantom lead vehicles.

Vehicles originating in branches 160, 162 and 164 behave similarly to the above description of vehicles from branch 158.

Figure 10:
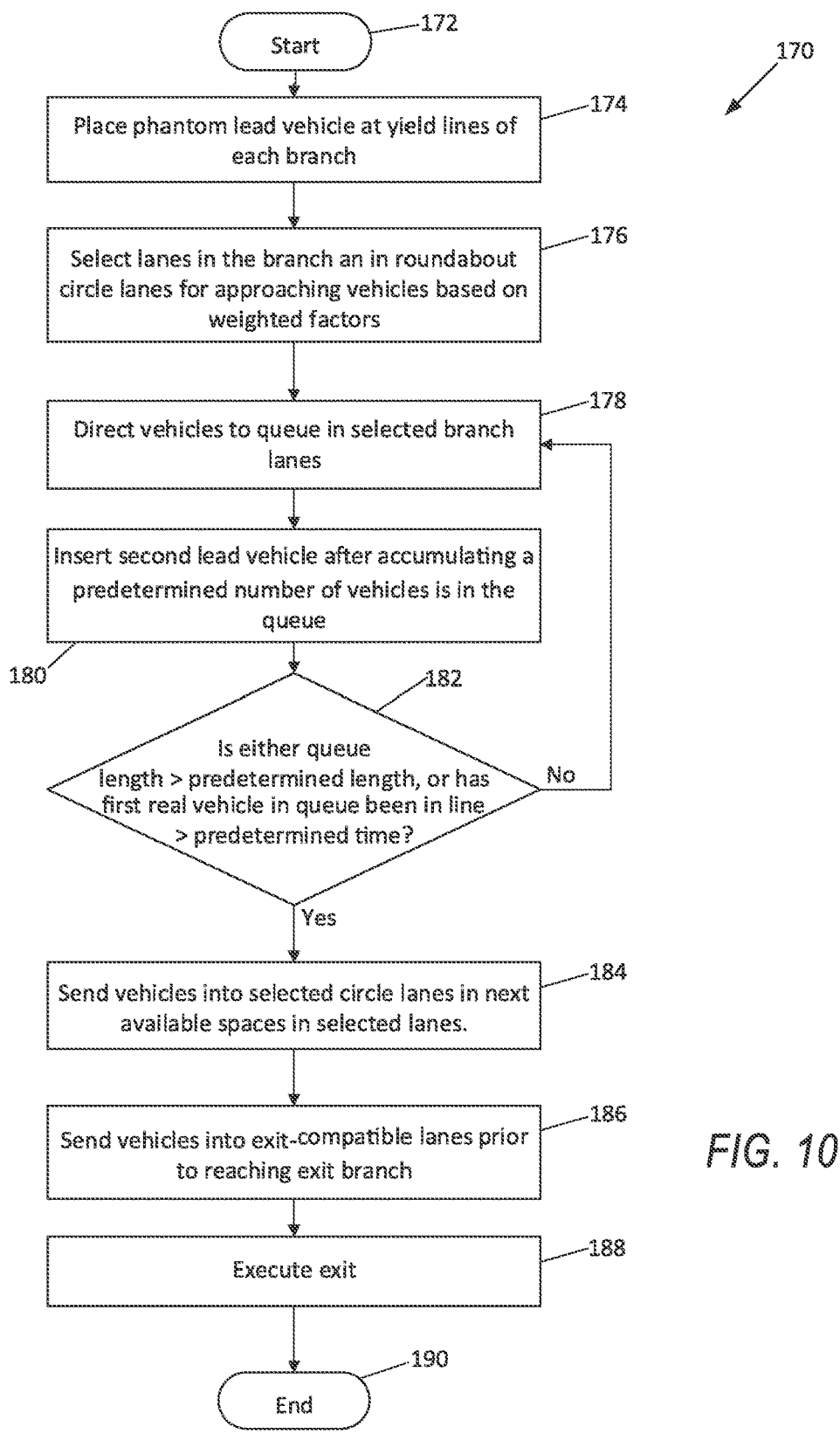
FIG. 10 illustrates a flow chart of example instructions for entering and exiting a roundabout consistent with FIG. 9.

FIG. 10 provides an exemplary illustration of a roundabout process 170 that may be stored in ECUs 20 of each of vehicles 12 of FIG. 9 and by intersection controller 16. Intersection controller 16 may execute the steps illustrated in FIG. 10, and as demonstrated in FIG. 9, as described below. A computer program for executing process 170 is instantiated in start block 172, e.g., when any of vehicles 12 approach roundabout 150. For the purpose of brevity in the description of process 170, all of the vehicles in FIG. 9 may be referred to generically as vehicle 12.

Process 170 moves to process block 174. Process block 174 places a phantom vehicle in each branch lane at the yield lines of each lane of each branch. As an example, phantom vehicles 12LPA and 12LPC were initially in branch 158 at a yield line (not shown). Vehicles 12A and 12C were queued behind phantom vehicles 12LPA and 12LPC respectively.

Process 170 moves on to process block 176. In process block 176, lanes in each of the branch and the circle lanes that will be used by each vehicle approaching the roundabout are identified and selected for each vehicle. In the example of FIG. 9, lanes in the roundabout 150 have been selected for each of vehicles 12. One factor to be considered in lane selection may be the anticipated exit branch for a vehicle. Vehicles making an exit at the first available branch would tend to be placed in the right lanes. Vehicles making an exit at later branches may be placed in the left lanes. Vehicles 12LPA, 12A, 12LPB and 12B are exiting to branch 164. All have had the right lane in branch 158 selected, and have had outer circle lane 156 selected and have had the right lane of branch 164 selected. Vehicles 12LPC and 12C have had the left lane of branch 158 selected, and have had the inner lane 154 selected. Such selections may occur while vehicles 12 are approaching roundabout 150 and before vehicles 12 are queued up.

Process block 176 is followed by process block 178. Block 178 directs vehicles to queue up in the selected branch lanes. Next, process block 180 inserts a second phantom lead vehicle into the queue when the length of the line reaches a limit beyond which entry to the circle lanes may become difficult and cause delays. A plurality of factors are considered when determining where lead vehicles are to be inserted. In the example of FIG. 9, phantom vehicles 12LPB and 12LPD were inserted into the queues of the right and left lanes of branch 158 to break the strings of vehicles into more manageable lengths.

Factors or data values that may be considered in determining where to place phantom lead vehicles and the associated length of platoons within the roundabout 98 may be selected based on known queue methods, and may include, by way of example, the factors discussed above in the context of the roundabout module 64, an arrival rate (i.e., a speed of incoming traffic to the branches 158, 160, 162, 164), a speed of the vehicles in the queue, the gaps between vehicles, a relative arrival time of the vehicles, an interarrival time (i.e., an arrival distribution), a service time distribution (i.e., a period of time to pass through the roundabout 98), a system capacity (i.e., a maximum number of vehicles that can be in the roundabout 98 at one time), a total population of vehicles and incoming vehicles (i.e., an instantaneous count of the number of vehicles in the circle lanes 154, 156 and the branches); and a pass-through rule or service rule (e.g., first come, first pass through). The service rule may be a goal that is not always achieved, as when a vehicle that is second to arrive enters the circles lanes after the first-to-arrive, but exits earlier because the first-to-arrive is exiting at a more distant branch. When vehicles 12 enter roundabout 98 from different branches and pass through the roundabout, 98 the method of queues, including the service rule, will be applied and the results may pass via DSRC system infrastructure to vehicles 12 as guide signals and as, alternatively, phantom vehicles and signals to generate phantom vehicles.

Process 170 then moves to decision block 182. Decision block 182 determines whether a first real or non-phantom vehicle has been waiting in line for more than a predetermined period of time, and if the queue has reached a predetermined length. If neither, the process 170 loops back to process block 178 and the vehicle is kept in the branch lane, while more vehicles are allowed to accumulate behind the non-phantom vehicle. When the non-phantom vehicle has been waiting for more than the predetermined period of time, or the queue has reached the predetermined length, then process 170 moves to process block 184 and the lead platoons are moved into the selected lanes in the next available spaces. Such is illustrated in FIG. 9 with vehicles 12LPA and 12A in lane 156, and vehicles 12LPC and 12C in lane 154.

Next, process 170 moves to process block 186 which directs vehicles into exit compatible lanes. This is illustrated in FIG. 9 by placing vehicles 12LPA, 12A, 12LPB and 12B in the right lane to exit to branch 164, and by placing vehicles 12LPC, 12C, 12LPD and 12D in the left lanes to exit to later branches 160 and 162. Process 188 directs vehicles 12 to complete their exits. Process 170 then moves to end block 190 and terminates.

Conclusion

An example system and method for guiding vehicles with sensors through a roundabout have been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computing device including a processor and a memory, the memory storing instructions executable by the processor to:
    project a first phantom vehicle into one of a branch and a circle lane of a roundabout in association with a first autonomous vehicle;
    create a plurality of phantom vehicles, with the first phantom vehicle being located at a yield line of a branch; and
    cause vehicles arriving in the branch to queue up behind the first phantom vehicle to form a platoon;
    cause the autonomous vehicle to enter the circle lane when upon predicting no collision with oncoming vehicles; and
    cause the autonomous vehicle to exit the roundabout.

2. The system of claim 1, wherein the computing device is further programmed to meld the first autonomous vehicle into the first phantom vehicle.

3. The system of claim 1, wherein the computing device is further programmed to:
    project the first phantom vehicle into the circle lane; and
    meld the autonomous vehicle with the phantom vehicle in the circle lane.

4. The system of claim 3, wherein the computing device is further programmed to create the phantom vehicle only after receiving permission of a vehicle ahead of a vehicle for which the phantom is created.

5. The system of claim 4, wherein when the roundabout has a plurality of circle lanes and a plurality of branch lanes, the computing device is further programmed to:
    select a branch lane for the autonomous vehicle to enter and cause the autonomous vehicle to enter the selected branch lane.

6. The system of claim 5, wherein the computing device is further programmed to:
    select a circle lane for the autonomous vehicle to enter and cause the autonomous vehicle to enter the selected circle lane.

7. The system of claim 1, wherein the computing device is further programmed to: cause the first phantom vehicle to lead the platoon from the branch into a selected circle lane.

8. The system of claim 7 wherein the computing device is further programmed to: cause the platoon to leave the branch lane for the selected circle lane when one of the vehicles in the platoon has been in the branch more than a predetermined period of time.

9. The system of claim 8, wherein the computing device is further programmed to: require the vehicles in the platoon to maintain a distance between the vehicles of less than one vehicle length.

10. A method of controlling an autonomous vehicle, the method comprising the steps of:
    projecting a first phantom vehicle into one of a branch and a circle lane of a roundabout in association with a first autonomous vehicle;
    creating a plurality of phantom vehicles, with the first phantom vehicle being located at a yield line of a branch; and
    causing vehicles arriving in the branch to queue up behind the first phantom vehicle to form a platoon;
    causing the autonomous vehicle to enter the circle lane when upon predicting no collision with oncoming vehicles; and
    causing the autonomous vehicle to exit the roundabout.

11. The method of claim 10, further comprising the step of melding the first autonomous vehicle into the first phantom vehicle.

12. The method of claim 10, further comprising:
    projecting the first phantom vehicle into the circle lane; and
    melding the autonomous vehicle with the phantom vehicle in the circle lane.

13. The method of claim 12, further comprising, creating the phantom vehicle only after receiving permission of a vehicle ahead of a vehicle for which the phantom is created.

14. The method of claim 13, further comprising, when the roundabout has a plurality of circle lanes and a plurality of branch lanes, the steps of selecting a branch lane for the autonomous vehicle to enter and of causing the autonomous vehicle to enter the selected branch lane.

15. The method of claim 14, further comprising the steps of entering the vehicle into the roundabout from a first branch of the roundabout and exiting the vehicle at a second branch of the roundabout.

16. The method of claim 10, further comprising the step of causing the first phantom vehicles to lead the platoon from the branch into a selected circle lane.

17. The method of claim 16, further comprising the step of causing the platoon to leave the branch lane for the selected circle lane when one of the vehicles in the platoon has been in the branch more than a predetermined period of time.

18. The method of claim 17, further comprising the step of requiring the vehicles in the platoon maintain a distance between the vehicles of less than one vehicle length.

* * * * *